(12) United States Patent
Park et al.

(10) Patent No.: US 11,941,024 B1
(45) Date of Patent: Mar. 26, 2024

(54) ORCHESTRATION SERVICE FOR DATABASE REPLICATION

(71) Applicant: Oracle International Corporation, Redwood Shores, CA (US)

(72) Inventors: Hoyong Park, San Jose, CA (US); Jagdev Dhillon, Menlo Park, CA (US); Alexander Kotopoulis, San Jose, CA (US); Arnab Nandi, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/966,746

(22) Filed: Oct. 14, 2022

(51) Int. Cl.
*G06F 16/00* (2019.01)
*G06F 3/0482* (2013.01)
*G06F 16/21* (2019.01)
*G06F 16/27* (2019.01)

(52) U.S. Cl.
CPC ............ *G06F 16/27* (2019.01); *G06F 3/0482* (2013.01); *G06F 16/21* (2019.01)

(58) Field of Classification Search
CPC ......... G06F 16/27; G06F 3/0482; G06F 16/21
See application file for complete search history.

(56) References Cited

U.S. PATENT DOCUMENTS

| | | | | |
|---|---|---|---|---|
| 8,429,121 | B2* | 4/2013 | Pareek | G06F 11/1466 707/610 |
| 9,785,894 | B2* | 10/2017 | Abraham | G06Q 10/06 |
| 11,144,407 | B1* | 10/2021 | Shankar | G06F 11/1469 |
| 11,330,053 | B1* | 5/2022 | Van Den Dungen | H04L 45/74 |
| 2013/0066834 | A1* | 3/2013 | McAlister | G06F 16/27 707/634 |
| 2013/0332484 | A1* | 12/2013 | Gajic | G06F 16/285 707/E17.014 |
| 2014/0337276 | A1* | 11/2014 | Iordanov | G06F 16/2365 707/602 |
| 2015/0032694 | A1* | 1/2015 | Rajamani | G06F 16/2358 707/625 |
| 2017/0024453 | A1* | 1/2017 | Raja | G06F 16/278 |
| 2017/0104847 | A1* | 4/2017 | Zhang | H04L 67/63 |
| 2017/0147669 | A1* | 5/2017 | Lo | G06F 16/27 |
| 2018/0173554 | A1* | 6/2018 | CaraDonna | G06F 11/2069 |
| 2018/0176318 | A1* | 6/2018 | Rathod | H04L 67/306 |
| 2018/0225311 | A1* | 8/2018 | Bandopadhyay | G06F 11/2094 |

(Continued)

*Primary Examiner* — Noosha Arjomandi
(74) *Attorney, Agent, or Firm* — Hickman Becker Bingham Ledesma LLP

(57) ABSTRACT

Techniques for implementing an orchestration service for data replication are provided. In one technique, a recipe is stored that comprises (1) a set of configuration parameters and (2) executable logic, for a data replication operation, that comprises multiple sub-steps. Each sub-step corresponds to one or more configuration parameters in the set of configuration parameters, which includes a first parameter that is associated with a default value and a second parameter that is not so associated. User input that specifies a value for the second parameter is received. The set of configuration parameters is updated to associate the value with the second parameter. The data replication operation is then initiated by processing the executable logic, which processing comprises, for each sub-step of one or more sub-steps, making an API call to a data replication service. In response to each API call, a response is received from the data replication service.

20 Claims, 7 Drawing Sheets

(56) References Cited

U.S. PATENT DOCUMENTS

| | | | | |
|---|---|---|---|---|
| 2018/0227243 A1* | 8/2018 | Zhang | ............... | H04L 41/40 |
| 2018/0262431 A1* | 9/2018 | Zhang | ............... | H04L 47/20 |
| 2019/0332366 A1* | 10/2019 | Natanzon | ............ | G06F 11/3696 |
| 2019/0342160 A1* | 11/2019 | Baddepudi | ............. | G06F 3/067 |
| 2020/0304383 A1* | 9/2020 | Bajaj | ................. | H04L 41/0843 |
| 2022/0046036 A1* | 2/2022 | Bastawala | ........... | G06F 11/3006 |
| 2022/0121632 A1* | 4/2022 | Sassin | .................. | G06F 16/245 |
| 2023/0047880 A1* | 2/2023 | Lenrow | .............. | H04L 41/0893 |
| 2023/0091775 A1* | 3/2023 | Manzano | ............. | G06F 16/212 |
| | | | | 707/756 |

* cited by examiner

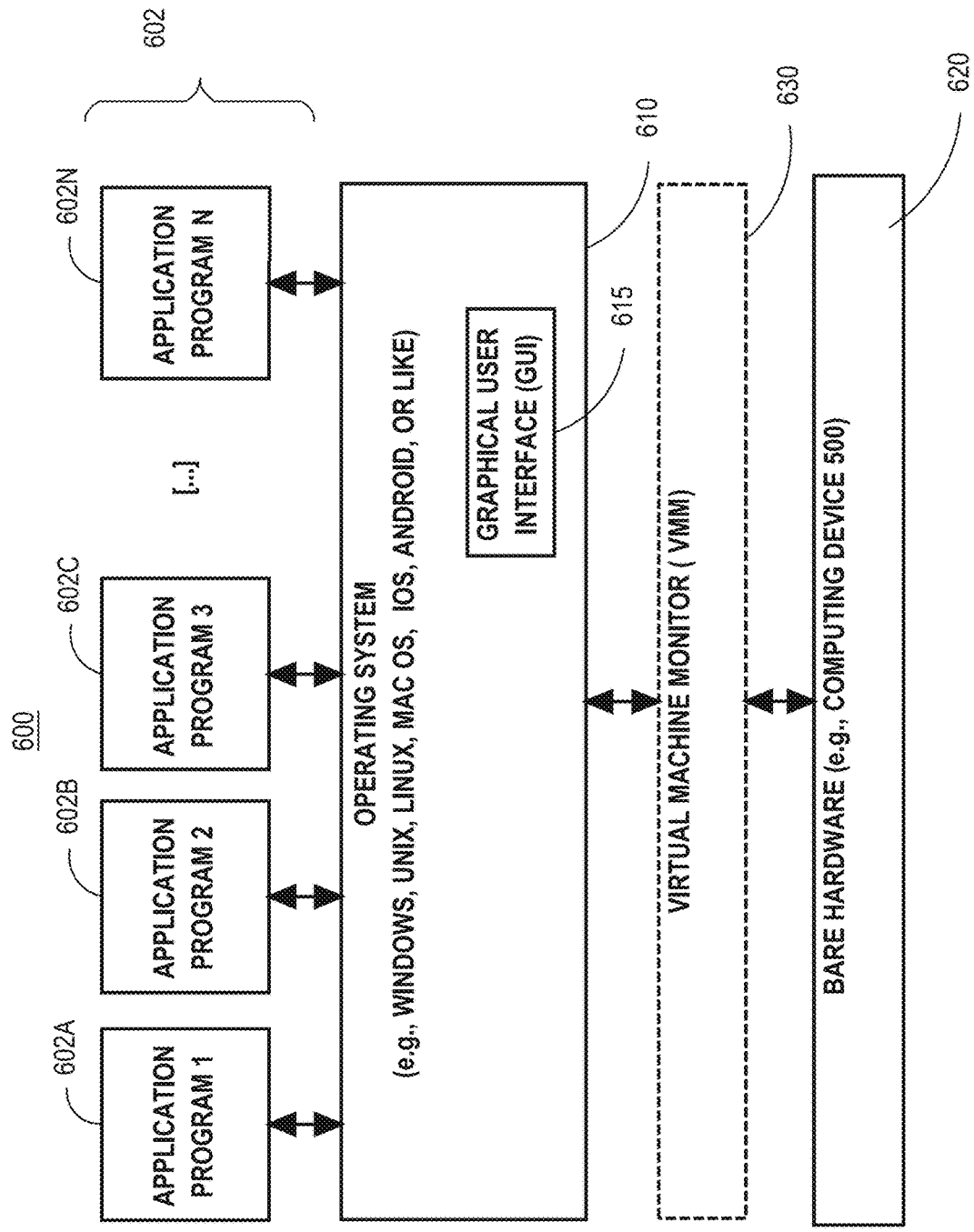

ORCHESTRATION SERVICE FOR DATABASE REPLICATION

BACKGROUND

Replicating data from one data source to another is a common task in modern data management solutions. Products and services have been developed to assist in replicating, filtering, and transforming data between data sources, even between heterogenous data sources. Some solutions, such as Oracle GoldenGate, enable the ability—to load, distribute, and filter transactions within an enterprise in real-time and enable migrations between different databases in near zero-downtime.

However, there are disadvantages to current solutions. For example, current solutions are complex technologies that require many configuration parameters and, therefore, user knowledge of those solutions, even in relatively simple replication use cases. In fact, a dedicated DBA (or database administrator) is often required to operate current solutions. Generally, industry is moving to toward business user centric task flows that do not require dedicated DB As.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the Drawings:

FIG. 6 is a block diagram of a basic software system that may be employed for controlling the operation of the computer system;

DETAILED DESCRIPTION

Figure 1:
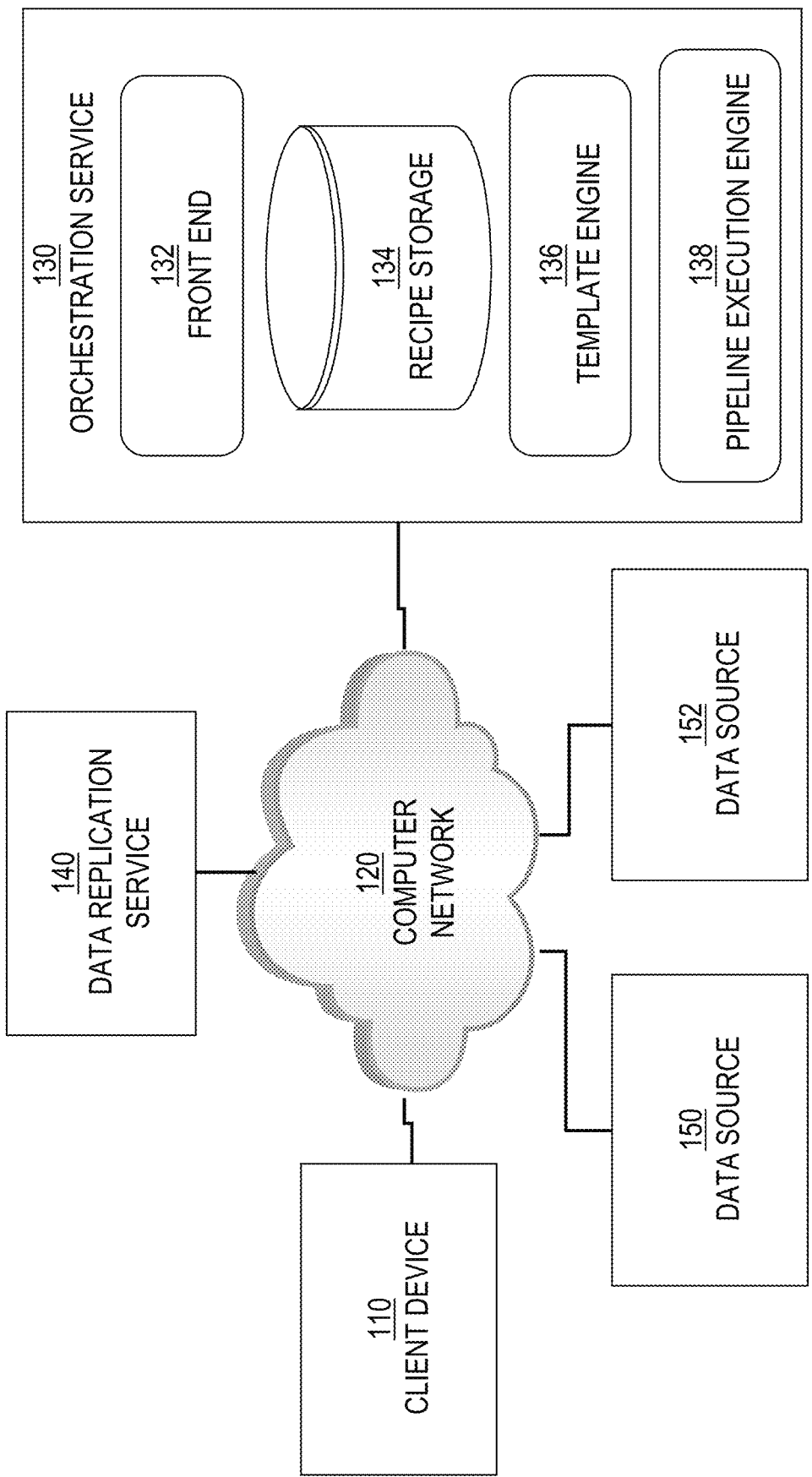
FIG. 1 is a block diagram that depicts an example system for simplifying data replication operations for end users of the system, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for establishing a replication pipeline for replicating data from one source to another are provided. In one technique, high-level constructs are introduced, such as Recipe and Pipeline, which assist in simplifying typical use cases by hiding complex details related to a replication service. Typical use cases include replication, backup, import, and events streaming. Each recipe corresponds to a different use case and specifies metadata and a set of executable steps that are executed by an orchestration service, which interacts with the replication service in place of a user.

Embodiments improve computer-related technology. Embodiments simplify typical use cases by hiding many technical details that are normally required to establish a data replication operation with a replication service. Embodiments include a metadata-driven user interface that is easily extendible, allowing for additional replication use cases to be easily added. Embodiments also include an execution framework that leverages API calls in order to interact with the replication service in performance of the data replication operation.

Recipes, Pipelines, and Connections

A "recipe" is (1) executable logic divided into steps and (2) metadata for configuration parameters. Each configuration parameter is used in executing one or more of the executable steps. The executable steps may be ordered in a linear fashion such that one or more executable steps are not performed until one or more other executable steps complete successfully. The executable logic may be a linear series of executable steps or may be a complex version of a directed acyclic graph (DAG), where two or more series of executable steps may originate from the same executable step and where the multiple series may be executed (or processed) simultaneously, or in parallel.

A recipe acts as a template and corresponds to a use case and one or more data replication operations. Examples of a data replication operation include unidirectional replication, bidirectional replication, replicate to multiple destinations, heterogenous replication (e.g., Oracle database to My SQL database), change event streaming, backup/restore, import, export, database migration, and replicated data verification. Thus, there may be different recipe for each of these use cases. A recipe defines multiple configuration parameters with metadata. Examples of executable logic in a recipe include Java, JavaScript, and shell script. One or more recipes may be selectable through a user interface, as described in more detail herein. For example, each recipe indicated in a user interface may have a name and a description associated with the recipe. The name and description may be included in the metadata of the recipe, which metadata a user interface renderer reads and uses to render the user interface.

A "pipeline" is an instance of one or more recipes. In other words, a pipeline is one or more configured recipes that includes values for the configuration parameters defined in the corresponding recipe(s). Some of the parameter values in a pipeline may be pre-defined in the corresponding recipe while other parameter values in the same pipeline may originate from a user that selects the corresponding recipe. Thus, a pipeline is output, from a user interface, that is generated based on a recipe and additional data as input.

An execution framework (described in more detail herein) ingests a pipeline as input and causes the set of executable steps of the corresponding recipe(s) to be performed. Some executable steps involve API calls (such as REST API calls) to a data replication service while other executable steps involve invoking any data connectivity code, such as JDBC (Java Database Connectivity) or Kafka Stream API for streaming application, in order to establish one or more connections with one or more data sources (e.g., a database, an event stream, etc.) and communicate with those data sources.

A "connection" is a set of parameters that defines a connection to a source data source or target data source. Examples of a connection include a connection to a data replication service (such as GoldenGate), a connection to a database, and a connection to a stream of events in an event streaming platform, such as a Kafka stream.

Example System

FIG. 1 is a block diagram that depicts an example system 100 for simplifying data replication operations for end users of the system, in an embodiment. System 100 includes a client device 110, a computer network 120, an orchestration service 130, a replication service 140, and data sources 150-152.

Client device 110 is a computing device that is communicatively coupled to orchestration service 130 over computer network 120. Computer network 120 may be a local area network (LAN), a wide area network (WAN), the Internet, or any combination of the three. Although only a single client device is depicted, system 100 may be able to support multiple client devices that are communicatively coupled to orchestration service 130.

Client device 110 may have a web browser installed thereon that allows web applications to execute within the web browser. Additionally or alternatively, client device 110 may have a native application installed thereon that is natively configured to communicate data requests to orchestration service 130 and receive (and display) data therefrom. Client device 110 includes a screen for displaying data that is transmitted from orchestration service 130 to the web browser or native application. Prior to embodiments described herein, client device 110 would interface directly with replication service 140, an example of which is GoldenGate. However, the amount of data and knowledge required to initiate even relatively simple data replication operations supported by replication service 140 makes the learning curve significant for new users and increases the chances for human error.

Orchestration Service

Orchestration service 130 hides the complexity of interacting with replication service 140 from client device 110 through the use of pre-defined recipes. Orchestration service 130 is implemented in software, hardware, or any combination of software and hardware. Orchestration service 130 may be hosted on a single computing device. Alternatively, orchestration service 130 may be hosted individually on each of multiple computing devices, such as in a server farm. In this way, if one computing device fails, then another computing device may accept data replication operation requests that the failed computing device would have normally handled. Alternatively, different components of orchestration service 130 are implemented on different computing devices that are communicatively coupled to each other.

In the depicted example, orchestration service 130 includes a front end 132, a metadata storage 134, a template engine 136, and an execution engine 138. Other implementations of orchestration service 130 may have more or fewer components.

Front end 132 interacts with client device 110 by receiving data requests from client device 110 and sending requested data to client device 110 for display (whether through (a) a web application executing within a web browser or (b) a native application). Front end 132 retrieves one or more recipes from recipe storage 134 in response to a data request from client device 110. A first data request from client device 110 may request a listing of available recipes, in which case front end 132 retrieve a listing from recipe storage 134 and sends the listing to client device 110. A second data request from client device 110 may request a specific recipe (e.g., by name or unique identifier), in which case front end 132 retrieves the recipe (and its associated metadata) from metadata storage 134. The metadata of a recipe is used by an application executing on client device 110 (e.g., a web application or a native application) to render a user interface that allows a user of client device 110 to specify one or more values for one or more configuration parameters of the recipe. The output of configured parameters with the metadata of a recipe is stored as a pipeline in the metadata storage 134. A third data request from client device 110 may request a specific pipeline (e.g., by name or unique identifier), in which case front end 132 retrieves the pipeline (and its associated metadata) from metadata storage 134. The metadata of a pipeline is used by an application executing on client device 110 to render a user interface that allows a user to modify one or more values for one or more configuration parameters of the pipeline.

Metadata storage 134 stores one or more pipelines and their associated metadata, such as configuration parameters and any metadata used by orchestration service 130, such as users, connections, pipeline results, and etc. Metadata storage 134 may be persistent or non-volatile storage, such as disk storage or Flash storage.

Template engine 136 accepts templates and converted versions of configuration parameters as input and generates payloads for API calls to replication service 140, which calls are initiated by execution engine 138.

Execution engine 138 ingests a pipeline, which is an instance of one or more recipes, executes executable steps indicated in the pipeline, including initiating data source operations (e.g., via JDBC) to one or more data sources and invoking (e.g., REST) API calls to replication service 140. In invoking operations/calls based on a pipeline, orchestration service 130 generates (e.g., via template engine 136) the payload of each call, whether to a data source or to replication service 140. The following set of steps of a recipe is invoked by orchestration service 130 given an example pipeline for data replication:

a. Check whether a source database and a target database meet certain requirements, such as archive logging is turned on, special users for extract and replicate is created and configured, the special user has all the required set of user privileges, the database is enabled for GoldenGate replication, the stream pool size of the database meets the required value, and the supplemental logging is enabled with the database.
   b. Check whether target schemas and tables exist.
   c. Create credentials for replication service 140.
   d. Create heartbeat tables.
   e. Create checkpoint table for a target database.
   f. Prepare supplemental logging of database objects for extraction.
   g. Create extract and start the extract process.
   h. Wait for open transactions to complete for initial loading.
   i. Perform initial loading.
   j. Create replicate and start the replicate process.

Steps a, b, i and part of h uses (e.g., JDBC) calls to data sources 150-152, while the remaining steps involve (e.g., REST) API calls to replication service 140. Step i could be ultimately performed by replication service 140, but JDBC may perform that step more efficiently. Without a recipe and orchestration service 130, a user would have to know about the necessity of each of these steps and how to invoke them, even in a relatively simple unidirectional replication use case. For example, without step h, data would be lost in data replication.

Connection Properties

A connection between orchestration service 130 and one or more entities (whether replication service 140 or data sources 150-152) has multiple properties. Examples of connection properties include the following:

| NAME | TYPE | DESCRIPTION |
| --- | --- | --- |
| connector | ConnectorType "Replication Service", "Data Source" | Connector type |
| role | ConnectorRole "Source", "Target", "Both" | Connector role |
| associatedID | String | Identifier of associated connection |
| associated | Connection | Associated Connection |
| properties | Map<String, Object> | Connection Properties |
| attachments | Map<String, Object> | Attachments of Connection |
| status | String | Connection validation status |
| result | StepResult | Connection validation result |

Examples of properties of a connection with replication service 140 (or when ConnectorType is Replication Service) are as follows:

| Name | Type | Description |
| --- | --- | --- |
| hostName | String | Host name of Replication service MSA |
| port | int | Reverse proxy port of Replication service MSA |
| userName | String | Username of service manager |
| password | String | Password of service manager |
| deployment | String | Deployment Name |
| deploymentUserName | String | Username of deployment |
| deploymentPassword | String | Password of deployment |
| credentialDomain | String | Credential domain to use |

Examples of properties of a connection with a source data source (e.g., data source 150) (or when ConnectorType is Data Source) are as follows:

| Name | Type | Description |
| --- | --- | --- |
| databaseType | String | Database Type |
| connectionType | int | Connection Type |
| hostName | String | Host name |
| port | int | Port |
| userName | String | Username |
| password | String | Password |
| cdb | String | Name of CDB |
| pdb | String | Name of PDB |

Recipe Annotation

As described herein, a recipe includes executable logic and metadata. Such metadata is also referred to herein as a "recipe annotation." A recipe annotation defines a set of metadata (for a recipe) that is used (by front end 132) to generate user interface data. An example of a recipe annotation for data replication is the following:

```
@oracle.cloud.ggfe.api.annotations.Step(
    id="F4D5736F-0FF2-41AF-84C9-1C3D145D8D7C",
    name="Replicate",
    stepClass=Replicate.class,
    version="1.0",
    title="replicateTitle",
    description="replicateDescription",
    categories=PredefinedCategories.REPLICATE,
    configClass=ReplicateConfig.class,
    image="replicate.png",
    resourceBundle="Replicate MsgBundle",
    configTemplates=
        @ConfigTemplate(name="extract",
            template="extract.prm"),
        @ConfigTemplate(name="replicat",
            template="replicat.prm"),
        @ConfigTemplate(name="initialLoad.sql",
   template="@%    DATABASE_TYPE    %/initialLoad.
    sql")
}, . . . .
```

The "id" is an identifier for the recipe, the "name" is the name of the recipe, the "stepClass" is the Java class that implements the recipe functionalities, which is a use case. For example, this example recipe annotation implements a 'Replicate' use case by using a GoldenGate replicate service, another recipe named Backup/Import could implement a 'Backup/Import' use case, and another recipe name Database Migration could implement a 'Database migration' use case, and so forth. The "title" is a resource key for the title of the recipe (which title may be displayed with the recipe in the user interface), the "description" is a resource key for the description of the recipe (which description may be displayed with the recipe in the user interface), the "categories" identifies one or more categories of the recipe, the "configClass" is a Java class that defines configuration parameters of the recipe, the "image" is an image representing the recipe (which image is presented on the user interface), the "resourceBundle" is a resource bundle that supports National Language Support (NLS) strings (where NLS is an architecture that allows for the storing, processing, and retrieving of data in native languages and that ensures that database utilities and error messages, sort order, date, time, monetary, numeric, and calendar conventions automatically adapt to a native language and locale), and the "configTemplates" reference templates for the inputs for template engine 136 and include the API call payload or SQL. In this example, three configuration templates are defined: 'extract' and 'replicat' for the API call payload and initialload.sql for SQL executed by JDBC.

A recipe annotation is converted into a file of another data format using a recipe metadata generation tool, a type of developer tool, which reads recipe annotations and multiple class files and converts the recipe annotations into a yaml file. A recipe developer writes implementation code of steps in a preferred language and composes recipe metadata. A recipe developer places metadata annotations in the implementation code, which, when executed, generates the metadata yaml file using the metadata generation tool.

The implementation code of a recipe involves writing java code. For example, for a replicate recipe, there is 'replicate' step and several sub-steps. One of sub-steps is 'addExtract' in which a recipe developer writes REST API calls to replication service 140, while for sub-step, 'initialLoad' the recipe developer writes code using JDBC and runs a SQL procedure to invoke 'Data Pump'. While writing this code, the recipe developer uses recipe annotations (e.g., written in Java) to create recipe metadata. However, this recipe metadata is only accessible to front end 132 when the metadata is converted to a yaml file using the metadata generation tool. Again, recipe metadata drives the user interface, which consumes metadata of the recipe (e.g., title of the recipe, description of the recipe, and all other metadata for configuration parameters defined in the recipe). The user interface consumes metadata from yaml file, which is why metadata of the recipe is converted to yaml from (e.g., Java) annotations with the metadata generation tool.

A yaml file is used to generate at least a portion of a user interface corresponding to the recipe. YAML (or "yaml") is a human-readable data serialization language that is used to create configuration files with any programming language. YAML is a strict superset of JSON (JavaScript Object Notation), another data serialization language.

The following is another example of a recipe annotation (named "Replicate"), followed by a metadata yaml file (also named "Replicate") that is generated based on the recipe annotation and multiple class files referenced in the recipe annotation:

```
@Step(
    id = "F4D5736F-OFF2-41AF-84C9-1C3D145D8D7C",
    name = "Replicate",
    stepClass = Replicate.class,
    version = "0.1",
    title = "Replicate",
    description = "Replicate table, schema, and database",
    configClass = Replicate.ReplicateConfig.class,
    image = "replicate.png",
    configTemplates = {
        @ConfigTemplate(name="extract", template="" +
        " Extract {{ extraName }}\n" +
        " Extrail {{ extractTrailName }}\n" +
        " UseridAlias {{ pdbadminAlias }}\n" +
        " DDL      INCLUDE MAPPED\n" +
        " {% for dbobj in sourceObjects %}\n" +
        " Table {{ dbobj.schema }}.{{ dbobj.table }};\n" +
        " {% endfor %}"),
    }
)
public class Replicate extends BaseStep<ReplicateContext> implements Transactional<ReplicateContext> {
    public static class ReplicateConfig extends Parameters {
        @ConfigParam(
            name = PARAM_INITIAL_LOAD,
            title = "Initial Load",
            description = "Initial Load",
            typeName = UIDataTypes.BOOLEAN,
            widgetTypeName = UIWidgetTypes.CHECK_BOX,
            default Value = "true",
            group = "Replication options",
            uiOrder = 3
        )
        }
        public Boolean initialLoad( ) {
            return getBoolean(Replicate.PARAM_INITIAL_LOAD, true);
        }
                    METADATA YAML
id: "F4D5736F-OFF2-41AF-84C9-1C3D145D8D7C"
name: "Replicate"
className: "oracle.cloud.ggxe.orchestrator.steps.Replicate"
version: "0.1"
title: "Replicate"
description: "Replicate table, schema, and database"
image: "replicate.png"
parameters:
```

-continued

```
- name: "mappings"
  title: "mappingsTitle"
  description: "mappingsDescription"
  typeName: "list"
  required: true
  defaultValue: "null"
  widgetTypeName: "DATABASE_OBJ_MAPPER"
  uiOrder: 0
  tab: "mappingsTab"
  disabled: false
  advancedOption: false
- name: "initialLoad"
  title: "initialLoadTitle"
  description: "initialLoadDescription"
  typeName: "boolean"
  required: false
  default Value: "true"
  widgetTypeName: "CHECK_BOX"
  uiOrder: 1
  tab: "optionsTab"
  disabled: false
  advancedOption: false
- name: "includeDdl"
  title: "includeDdlTitle"
  description: "includeDdlDescription"
  typeName: "boolean"
  required: true
  default Value: "true"
  widgetTypeName: "CHECK_BOX"
  uiOrder: 2
  tab: "optionsTab"
  disabled: false
  advancedOption: false
- name: "extractAutorestartEnable"
  title: "extractAutorestartEnableTitle"
  description: "extractAutorestartEnableDescription"
  typeName: "boolean"
  required: true
  default Value: "false"
  widgetTypeName: "CHECK_BOX"
  uiOrder: 23
  group: "extractAutorestartGroup"
  tab: "optionsTab"
  advancedTab: "extractAdvancedOptionsTab"
  disabled: false
  advancedOption: true
- name: "extractAutorestartDelay"
  title: "extractAutorestartDelayTitle"
  description: "extractAutorestartDelayDescription"
  typeName: "integer"
  required: true
  defaultValue: "0"
  widgetTypeName: "INPUT_NUMBER"
  uiOrder: 24
  group: "extractAutorestartGroup"
  tab: "optionsTab"
  advancedTab: "extractAdvancedOptionsTab"
  disabled: false
  advancedOption: true
- name: "extractAutorestartDisableOnFailure"
  title: "extractAutorestartDisableOnFailureTitle"
  description: "extractAutorestartDisableOnFailureDescription"
  typeName: "boolean"
  required: true
  default Value: "true"
  widgetTypeName: "CHECK_BOX"
  uiOrder: 25
  group: "extractAutorestartGroup"
  tab: "optionsTab"
  advancedTab: "extractAdvancedOptionsTab"
  disabled: false
  advancedOption: true
- name: "extractAutorestartFailures"
  title: "extractAutorestartFailuresTitle"
  description: "extractAutorestartFailuresDescription"
  typeName: "integer"
  required: true
  default Value: "1"
  widgetTypeName: "INPUT_NUMBER"
```

-continued

```
uiOrder: 26
group: "extractAutorestartGroup"
tab: "optionsTab"
advancedTab: "extractAdvancedOptionsTab"
disabled: false
advancedOption: true
- name: "extractAutorestartOnlyIfFails"
  title: "extractAutorestartOnlyIfFailsTitle"
  description: "extractAutorestartOnlyIfFailsDescription"
  typeName: "boolean"
  required: true
  defaultValue: "true"
  widgetTypeName: "CHECK_BOX"
  uiOrder: 27
  group: "extractAutorestartGroup"
  tab: "optionsTab"
  advancedTab: "extractAdvancedOptionsTab"
  disabled: false
  advancedOption: true
- name: "extractAutorestartRetries"
  title: "extractAutorestartRetriesTitle"
  description: "extractAutorestartRetriesDescription"
  typeName: "integer"
  required: true
  defaultValue: "9"
  widgetTypeName: "INPUT_NUMBER"
  uiOrder: 28
  group: "extractAutorestartGroup"
  tab: "optionsTab"
  advancedTab: "extractAdvancedOptionsTab"
  disabled: false
  advancedOption: true
- name: "extractAutorestartWindow"
  title: "extractAutorestartWindowTitle"
  description: "extractAutorestartWindowDescription"
  typeName: "integer"
  required: true
  defaultValue: "60"
  widgetTypeName: "INPUT_NUMBER"
  uiOrder: 29
  group: "extractAutorestartGroup"
  tab: "optionsTab"
  advancedTab: "extractAdvancedOptionsTab"
  disabled: false
  advancedOption: true
```

Configuration Annotation

A configuration annotation defines a set of metadata for a configuration parameter that a recipe defines. A recipe may define multiple configuration annotations. A configuration annotation is consumed by a recipe metadata generation tool. The configuration annotation is referenced by the recipe annotation through a configClass annotation in the recipe annotation. The configuration annotation is also consumed by the recipe metadata generation tool and is part of a recipe. The following are two examples of configuration annotations that may be found in the same recipe:

```
@ConfigParam(
    name="mappings",
    title="mappingsTitle",
    description="mappingsDescription",
    typeName=UIDataTypes.LIST,
    widgetTypeName=UIWidgetTypes.DATABASE_
        OBJ_MAPPER,
    tab=TAB MAPPINGS,
    uiOrder=0
)
@ConfigParam(
    name="initialLoad",
    title="initialLoadTitle",
    description="initialLoadDescription",
    typeName=UIDataTypes.BOOLEAN,
    widgetTypeName=UIWidgetTypes.CHECK_BOX,
    defaultBooleanValue=DEFAULT_PARAM_INITIAL_
        LOAD,
    required=false,
    tab=TAB OPTIONS,
    uiOrder=1
)
```

The following is a list of attribute names for each generic configuration parameter (some of which are indicated in the two example configuration annotations above) and a brief description:

name—name of the configuration parameter
title—resource key of the title
description—resource key of the description
typeName—type of the configuration parameter
required—A flag to indicate if this parameter is required
defaultValue—default value
widgetTypeName—type of widget to use to render this parameter
selectOptions—available options for a 'select' widget type, such as a drop down list
group—a group to which this parameter belongs; a group of parameters are displayed together in a UI and may be visually distinguished from one or more parameters outside of the group, such as with a box drawn around the group
tab—a user interface tab to which this parameter belongs
advancedOption—a flag to indicate if this parameter is advanced
uiOrder—an order in which to render this parameter in the UI The first example configuration parameter is about mappings and the second example configuration parameter is about initial loading.

Each configuration annotation indicates a widget type. Examples of primitive widget types include input text (which is a text box for a general text string), input number (which is a text box for numbers), input date (which is a text box for date and time), input password (which is a text box for a password), input file (which is a text box for uploading a file), input duration (which is a text box for a duration), a check box for Boolean input, a drop down select box for multiple options, and a combo box (which is for multiple options with manual input). Examples of complex widget types include single a database object selector (which allows a user to select a single database object, such as a schema or a table), a multiple database object selector (which allows a user to select multiple database objects), a database object mapper (which provides mapping functionality to map a source schema/table to a target schema/table), and list string (which is a list of editable strings and allows a user to enter multiple strings). In the example configuration annotations, the UI data type of the second configuration parameter is "Boolean" (a primitive type) and that configuration parameter has a checkbox widget in the user interface, when rendered. On the other hand, the database object mapper (of the first configuration parameter) is an example of a complex type of widget.

A configuration file containing one or more configuration annotations is converted into another file that front end 132 processes to generate user interface data. An example of such another file is a yaml file. Not only are the configuration annotations for displaying configuration parameters in a user interface presented on a screen of client device 110, the configuration annotations also ensure that the configuration parameters are saved in the appropriate format so that orchestration service 130 can process them properly and invoke APIs of replication service 140 and JDBC calls of data sources 150-152.

Configuration Templates

A configuration template is used to create (a) a payload of an API call that orchestration service 130 makes to replication service 140 or (b) a SQL file of a JDBC call that orchestration service 130 makes to data source 150 or data source 152 when processing a pipeline. An example of such an API call is a REST API call to "create extract" in step g of the example recipe for replication. An example of an extract configuration template (named "Extract.prm") is as follows:

```
Extract.prm
Extract {{{extractName}}}
ExtTrail {{{extractTrailName}}}
UseridAlias {{{dbadminAlias}}}
% DATABASE_TYPE_SPECIFIC %
{{# includeDdl}}
DDL INCLUDE MAPPED
{{/includeDdl}}
{{#dbOptions}}
DBOPTIONS {{{toString}}}
{{/dbOptions}}
{{#extractParams}}
{{{toString}}}
{{/extractParams}}
REPORTCOUNT EVERY 15 MINUTES, RATE
FETCHOPTIONS, USESNAPSHOT, NOUSELATEST-
    VERSION, MISSINGROW REPORT
STATOPTIONS REPORTFETCH
WARNLONGTRANS 15 MINUTES, CHECKINTER-
    VAL 5 MINUTES
{{#sourceCatalog}}
SOURCECATALOG {{{sourceCatalog}}}
{{/sourceCatalog}}
{{#mappings}}
{{#isExclude}}
{{{getExclude}}}
{{/isExclude}}
{{/mappings}}
{{#mappings}}
{{^isExclude}}
{{{getExtractTable}}}
{{/isExclude}}
{{/mappings}}
```

The following is an example of a replicate configuration template (named "Replicat.prm"):

```
Replicat.prm
Replicat {{{replicatName}}}
UseridAlias {{{dbadminAlias}}}
% DATABASE_TYPE_SPECIFIC %
{{{ddlError}}}
{{{repError}}}
{{#replicatParams}}
{{{toString}}}
{{/replicatParams}}
{{#dbOptions}}
DBOPTIONS {{{toString}}}
{{/dbOptions}}
REPORTCOUNT EVERY 15 MINUTES, RATE
{{#sourceCatalog}}
SOURCECATALOG {{{sourceCatalog}}}
{{/sourceCatalog}}
{{#mappings}}
{{#isExclude}}
{{{getReplicatMapExclude}}}
{{/isExclude}}
{{/mappings}}
{{#mappings}}
{{^isExclude}}
{{{getReplicatMap}}}
{{/isExclude}}
{{/mappings}}
```

Orchestration service 130 (or template engine 136 within orchestration service 130) accepts a template and a template model as input and generates a payload therefrom. Template engine 136 substitutes a parameter name in a template (i.e., in double or triple brackets, such as "extractName") with a corresponding value in the template model, which is an internal data structure that is prepared by execution engine 138 for template engine 136. More specifically, a template model includes not only configuration parameter values specified by a user, but also other data (for example, identifiers) generated by execution engine 138. Some of the values in the template model originate directly from user input in the user interface (such as "includeDdl"), some values in the template model originate indirectly from user input (such as "sourceCatalog," which comes from source connection data), and some values in the template model are generated by the execution engine 138 (such as extractName). A template model is generated by execution engine 138 when each step (or sub-step) requires a template, such as steps "addExtract," "addReplicat," and "initialLoad." To be clear, a user specifies all configuration parameters through the UI, whether directly or indirectly by accepting default values. However, some configuration parameters are not directly used by template engine 136. Instead, execution engine 138 converts such configuration parameters into another value or another object in a template model. For example, "mappings" is one example of a configuration parameter that execution engine 138 processes and prepares for inserting into a template model. In this example, a user specifies a mapping in the form of a list, such as <source schema, source table, target schema, target table, exclude flag>. However, execution engine 138 separates this mapping into two lists.

Example Create Extract API Call

The following is an example of a create extract REST API call, to replication service 140, that orchestration service 130 (or template engine 136) generates in response to receiving a template and a template model:

```
post: http://ogg:80/services/adminsrvr/v2/extracts/E7
entity: {
  "begin" : "now",
  "config" : [
    "Extract          E7",
    "ExTrail          AB".
    "UseridAlias      sal5",
    "DDL              INCLUDE MAPPED",
    "    Table GGUSER01.EMP;",
    "    Table GGUSER01.DEPT;",
  ],
  "status" : "running",
  "targets" : [{
    "name" : "AB"
  }],
  "registration" : {
    "optimized" : true
  },
```

-continued

```
    "source" : "tranlogs",
    "credentials" : {
      "alias" : "sal5"
    }
  }
}
```

The endpoint of the API call follows the "post" tag in the first line of this example API call. The payload of the API call is encapsulated in the entity element, which is introduced in the second line of the example API call.

Pipeline Structure

As described herein, after a user interacts with a user interface (displayed on a screen of client device 110) with the front end 132 to select a recipe and specifies one or more values for one or more configuration parameters, orchestration service 130 generates an instance of the recipe (i.e., a pipeline). The following JSON is an example of a structure of a pipeline:

```
{
  "id": "6A271E73-F7C4-4DE4-8282-E7B86284E9FB",
  "name": "ReplicateSchemas",
  "description": "Test Schema Replication",
  "sourceId": "14E69589-3ED1-4FA9-9349-8ADA9CD46E60",
  "targetId": "377F8D07-AC7B-477C-B7EF-BB4DA797F262",
  "steps": [
    {
      "name": "oracle.cloud.ggfe.orchestrator.steps.replicate.Replicate",
      "recipeId": "F4D5736F-OFF2-41AF-84C9-1C3D145D8D7C",
      "parameters": {
        "mappings": [
          { "source": { "schema": "GGUSER01" }, "target":
          { "schema": "GGUSER02" } }
        ],
        "initialLoad": "true",
        "tableExistsAction": "REPLACE",
        "initialLoadJobDuraion": "3600",
        "waitForOpenTxnsDuraion": "3600",
        "includeDdl": "true",
        "ddlError": "KILL",
        "extractParams": [ ],
        "extractAutorestartEnable": "false",
        "extractAutorestartDelay": "0",
        "extractAutorestartDisableOnFailure": "true",
        "extractAutorestartFailures": "1",
        "extractAutorestartOnSuccess": "false",
        "extractAutorestartRetries": "9",
        "extractAutorestartWindow": "60",
        "replicatError": "KILL",
        "replicatErrorMaxRetry": "0",
        "replicatErrorDelay": "0",
        "replicatParams": [ ],
        "replicatAutorestartEnable": "false",
        "replicatAutorestartDelay": "0",
        "replicatAutorestartDisableOnFailure": "true",
        "replicatAutorestartFailures": "1",
        "replicatAutorestartOnSuccess": "false",
        "replicatAutorestartRetries": "9",
        "replicatAutorestartWindow": "60"
      }
    }
  ],
```

The sourceId' element indicates a source identifier that identifies a source data source connection while the 'targetId' element indicates a target identifier that identifies a target data source connection. These identifiers may have originated from a user through a user interface that requests such identifiers in order to establish connections with the respective data sources.

The elements within the "steps" element (i.e., name and recipeId) originate from a recipe from which the pipeline derives.

Metadata-Driven User Interface: Rendering

In an embodiment, front end 132 includes a user interface (UI) renderer that generates UI data based on metadata associated with one or more recipes. Because the metadata used to generate UI data is associated with a recipe and not hard-coded, the UI that client device 110 generates is said to be "metadata-driven" and, therefore, is extendible. New recipes may be created for new use cases and a UI that references those new recipes may be generated from metadata in those new recipes.

An initial user interface may be relatively simple by primarily listing one or more available recipes. Such recipes may be retrieved from metadata storage 134 that is accessible to the UI renderer. The UI renderer reads a name, description, and/or image file referenced in metadata associated with a recipe, generates UI data therefrom, and transmits the UI data to client device 110 over computer network 120. Client device 110 generates a user interface on a screen based on the UI data.

A user may select a listed recipe in a user interface in one or more ways. For example, a user operates a cursor control device by clicking an image or name of the listed recipe. As another example, a user taps (with his/her finger) an area, of a touchscreen, where the image or name of the listed recipe is presented.

In response to user selection of a recipe (or in response to a default selection), the UI renderer initializes a widget map (that maps names to UI elements, i.e., widgets) and reads metadata associated with the recipe. ("Rendering" refers to creating Javascript objects in the browser of client device 110. For example, a textBox widget is rendered as HTML text input and also accepts user text input; the select widget may be rendered as a drop down list and accepts user selections.) Since front end 132 is metadata-driven, once front end 132 receives recipe metadata from orchestration service 130, front end 132 operates on the metadata with the help of a backend server API (not depicted) for some UI operations, such as "Database object selector" or "database object mapper." Such UI operations require fetching database schemas and tables from a source/target data source. These UI operations are performed by the backend API server.

Figure 2:
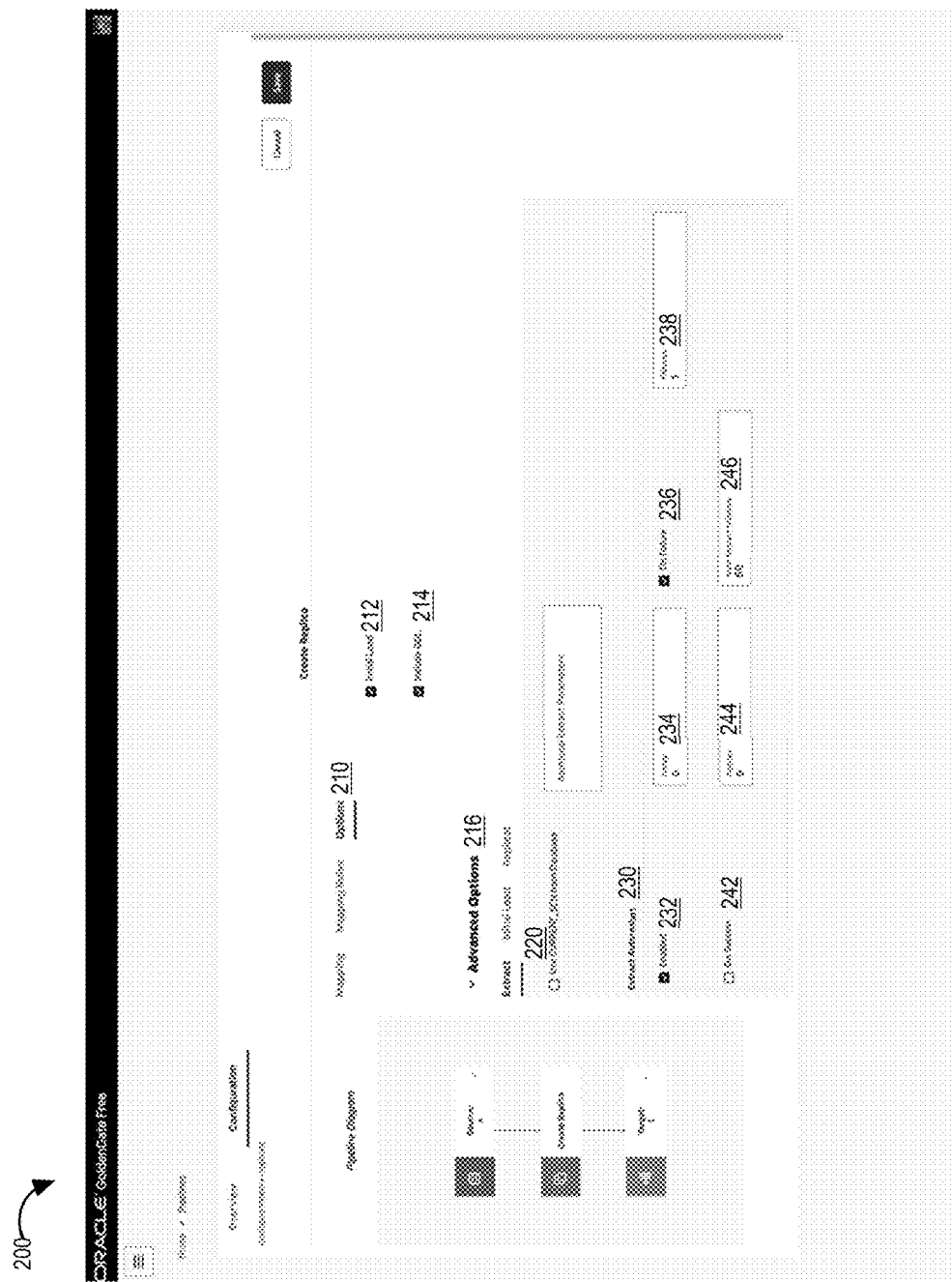
FIG. 2 is a screenshot of an example user interface that presents graphical user interface elements (or widgets) that are generated based on configuration metadata associated with a recipe, in an embodiment.

The metadata is organized into sections referred to as "tabs." A "tab" is a primary section of the user interface. Options 210 is one example of a tab in FIG. 2. Mapping and Mapping Rules in FIG. 2 are additional examples of tabs. Other sections of the user interface include "group" (e.g., Extract Autorestart 230), "advanced options" (e.g., Advanced Option 216), and "advanced tab" (e.g., Extract 220). All configuration parameters belonging to the same tab are grouped together. The rendering is performed in two phases recursively, once with the "advanced tab" (if one exists) and one without the "advanced tab." The same logic is applied in both phases with a difference of a tab referring to the root level tab and a tab referring to the "advanced tab" level tab.

The UI renderer selects a tab and iterates through each configuration parameter in that tab. If the configuration metadata has a uiOrder attribute, then the UI renderer first orders the parameters in a tab based on the uiOrder attribute values of those parameters.

For each ordered parameter in the selected tab, the UI renderer renders the group or the non-group parameter. If a configuration parameter belongs to a group, then the UI renderer first renders the group (e.g., drawing a rectangular shaded box as the group) and associates the configuration parameter with the group. The configuration parameters without a group property field are rendered with the type indicated in the value field associated with the widgetType-Name attribute.

If the configuration metadata indicates that the selected parameter is a default value, then the UI renderer sets a value in the UI with that default value.

The UI renderer also determines whether the selected parameter is advanced. Parameters with an advanced property field will be rendered in an 'advanced option' section by applying the same logic as above, except using the 'advancedTab' property field as the tab.

FIG. 2 is a screenshot of an example user interface 200 that presents graphical user interface elements (or widgets) that are generated based on configuration metadata associated with a recipe, in an embodiment. UI 200 includes an Options tab 210 and, within the options tab 210, an initial load option 212, a DDL option 214, and an Advanced Options tab 216. Within Advanced Options tab 216 is an Extract tab 220, and within the Extract tab 220 an Extract Autorestart group 230 that includes multiple widgets (each corresponding to a different configuration parameter). Widgets in Extract Autorestart group 230 provide user flexibility in whether and how replication service 140 will react to a failure during execution of the extract operation. These widgets include an enable option 232, a delay number 234, an on failure option 236, a failure number 238, an on success option 242, a retries number 244, and an auto-restart window 246. Some of the values of the corresponding widgets may be default values (i.e., that were specified in the metadata of the corresponding configuration parameter) while other values might have been input (or selected) by a user to which UI 200 is presented on a screen of a computer display.

Metadata-Driven User Interface: Saving

After one or more selections (pertaining to one or more configuration parameters) are made with respect to widgets (i.e., selectable elements) in a rendered user interface, the user provides input to save the one or more selections, whether default selections, user selections, or a combination of both. In response to input to save a set of configuration parameters pertaining to a recipe, orchestration service 130 generates a pipeline and stores the pipeline in metadata storage 134.

Generating a pipeline involves the following actions that orchestration service 130 performs. First, a value map that associates a name with an object is initialized. Then, for each configuration parameter from the selected recipe, the following actions are performed. A widget from the widget map generated previously is retrieved and is identified by a name that is mapped to the widget in the widget map. A value associated with the retrieved widget is identified. The value is converted with the typeName specified in the configuration parameter metadata. The value that results from the conversion (or "converted value") is inserted into the value map, where the converted value is associated with the name that is mapped to the widget in the widget map. The process repeats for the next configuration parameter until all the configuration parameters associated with the selected recipe are processed.

Once all the configuration parameters are processed, front end 132 converts the value map into a data interchange format, such as JSON, which is a lightweight, text-based, language-independent data interchange format and stores the converted value map into metadata storage 134.

Execution Pipeline

As described herein, a pipeline is an instance of a recipe with configured parameters, or configuration parameters that have been assigned values through the user interface process.

For ease of explaining pipeline execution, the following terms will be used. A "step" is an executable step that is hierarchical and has more than one sub-step. In this terminology, the root step is associated with a recipe, which comprises multiple sub-steps. The sub-steps are executable actions that are performed to complete the root step. Examples of sub-steps are steps a-j described above for the replicate recipe.

A "step configuration" is a set of configured parameters for a root step. A step configuration includes all the configured parameters of all sub-steps of the corresponding root step. "Context" refers to any state object that is stored for a step or sub-step. Context may be used in case of a failure in order to (a) roll back any changes as a result of executing a pipeline or (b) continue processing in case of a retry beginning from the point or time of failure. "Status" refers to the status of a step or sub-step, such as completed, in progress, or failed. An "artifact" refers to any object that is generated as a result of executing a step or sub-step. Thus, an artifact is output of a step or sub-step and is generated by replication service 140. Examples of artifacts include credential names generated in the 'createCredentials' sub-step, a checkpoint table name generated in the 'createCheckpointTable' sub-step, a heartbeat table name generated in the 'createHeartbeatTable', an extract name generated in the 'addExtract' sub-step, and a replicat name generated in the 'addReplicat' sub-step. A "message" is any message string or exceptions that are generated while executing a step or sub-step.

Pipeline Result Data Model

The following is an example of a pipeline result data model for modeling the result of executing a pipeline:
PipelineResult {
  Status status;
  Map<String, StepResult>stepResults;
}
StepResult {
  String recipeId;
  Status status;
  String title;
  String description;
  Object context;
  Map<String, StepResult> sub Steps;
  Map<String, Object> artifacts;
  List<Object> messages;
}
Because a pipeline may comprise multiple recipes, whether of the same type or different types, this example pipeline result object not only includes a status of the overall pipeline, but a mapping of one or more step results, each step result corresponding to a different recipe. Also, each step result has its own status, title, description, and context, as well as a mapping of one or more sub-steps, a mapping of artifacts that are generated during execution of the corresponding step, and a list of messages that are generated during step execution.

Step/Sub-Step Status

In an embodiment, a step (and sub-step) may be associated one of multiple possible statuses. In a related embodiment, the set of possible statuses to which a step may have depends on the type of step. For example, for one type of step (e.g., "regular" steps), there is pending (meaning that the step has not yet begun), in progress (meaning that the step has begun but not yet completed or failed), completed, and error/failed. For flag-based steps, example statuses include verified and failed. Examples of flag-based steps include configuring a data source to be compatible with replication service 140. For process-based sub-steps, example statuses include initialized, starting, running, stopping, stopped, killed, and unknown. Examples of process-based sub-steps include the extract and replicat sub-steps in the replicate recipe described herein.

Execution Pipeline

While executing a pipeline, events are generated for each update by orchestration service 130. The events are used by orchestration service 130 to save the pipeline result with a log-based approach. The events may be further used by front end 132 in order for smoother user interface updates instead of using a polling method where the pipeline result is polled at pre-defined time intervals where a significant number of updates may be generated at once. The following table lists an event type and a corresponding field that pertains to the event type.

TABLE A

| Event Type | Field |
| --- | --- |
| UPDATE_STATUS | Status |
| ADD_ARTIFACT | Artifact |
| ADD_MESSAGE | Message |
| UPDATE_PROGRESS | Progress |
| UPDATE_BEGIN_TIME | Begin Time |
| UPDATE_ESTIMATED_COMPLETION TIME | Estimated Completion Time |
| UPDATE_END_TIME | End Time |

When an update is received, orchestration service 130 determines an event type indicated in the update and then updates a value of a field that is associated with the event type. This updated value may be included in a user interface that is presented to a user, such as the same user that selected a recipe that was used to generate a pipeline that is currently being executed and causing the update to be generated.

Figure 3A:
FIGS. 3A-3B are screenshots of example user interfaces for displaying the status of sub-steps of a pipeline, in an embodiment.

FIG. 3A is a screenshot of an example user interface 300 for displaying the status of sub-steps of a pipeline, in an embodiment. UI 300 lists nine sub-steps of a replicate pipeline. UI 300 indicates the status of each sub-step (listed under "Steps" in UI 300) as "Pending" because, at this stage, pipeline execution has not yet begun.

Figure 3B:

FIG. 3B is a screenshot of an example user interface 350 for displaying the status of sub-steps in the pipeline, in an embodiment. In this example, pipeline execution has begun. UI 350 indicates a pipeline status of 352 of "in progress," and the statuses 354 of the nine sub-steps of the pipeline. Specifically, six of the nine sub-steps have completed, one sub-step is in progress, and two sub-steps are pending. UI 350 also indicates that a data pump job started successfully 356 and that the overall pipeline has been executed about 77.7% 358. UI 350 also provides an estimated time of completion 362 for each sub-step that has begun. Thus, UI 350 allows for the runtime diagnosability of pipeline execution.

Example Pipeline Result

The following is an example of a portion of a pipeline result that orchestration service 130 generates after executing a pipeline.

```
{
"steps" : {
  "replicate" : {
    "templateId" : "F4D5736F-OFF2-41AF-84C9-1C3D145D8D7C",
    "subSteps" : {
      "checkDatabase" : {
        "artifacts" : { },
        "messages" : [ ],
        "status" : "COMPLETED",
        "progress" : 100,
        "timeEstimatedCompletion" : 1662675946567,
        "timeBegin" : 1662675946558,
        "timeEnd" : 1662675946573
      },
...
```

In this example, one step (which corresponds to a recipe) in the pipeline result is a replicate step and the replicate step has multiple sub-steps, only one of which is outlined and that sub-step is checking a database. Checking a database produces a set of artifacts, messages, a status, a progress, and time information. An artifact may comprise a name and a link to retrieve the artifact from, for example, replication service 140.

Pipeline Execution Models

In an embodiment, there are two execution models that execution engine 138 of orchestration service 130 may implement to execute a pipeline. One execution model is transactional and the other is repeatable. A repeatable execution model may be used to continue a previous execution of a pipeline that failed or otherwise stopped. With repeatable execution, when a step or sub-step has failed, the state of each previously completed step and/or sub-step is saved so that the failed step or sub-step can be repeated upon restarting the failed pipeline. In this way, execution of the pipeline does not have to start at the beginning again with the first sub-step. For example, the result of a pipeline execution that failed is analyzed for the failed sub-step. Any artifacts, context, and messages associated with the failed sub-step are discarded. Execution of the pipeline at the failed sub-step begins with the artifacts/context/message of any completed steps or sub-steps stored in memory. Such data may be required for re-executing the failed sub-step or for a subsequent sub-step or step.

A transactional execution model may be used to restore the original state before execution of a pipeline began so that the pipeline can be restarted with fresh state upon restarting the failed pipeline. This means that any context, artifacts, or messages that were generated during execution of the pipeline are discarded. Alternatively, such data may be stored for later analysis to determine a root cause of the failure, if the failure was unexpected and its causes initially unknown.

Execution engine 138 may have a default execution model, which may be repeatable or transactional. Also, a user interface (e.g., at the time of selecting a recipe and specifying certain configuration parameters) may provide an option for a user to specify which execution model to use for a particular pipeline. For example, a default execution model may be transactional, but a user provides input through a user interface to select the repeatable model and one or more options related to the repeatable model, such as a number of retries.

Example Process

Figure 4:
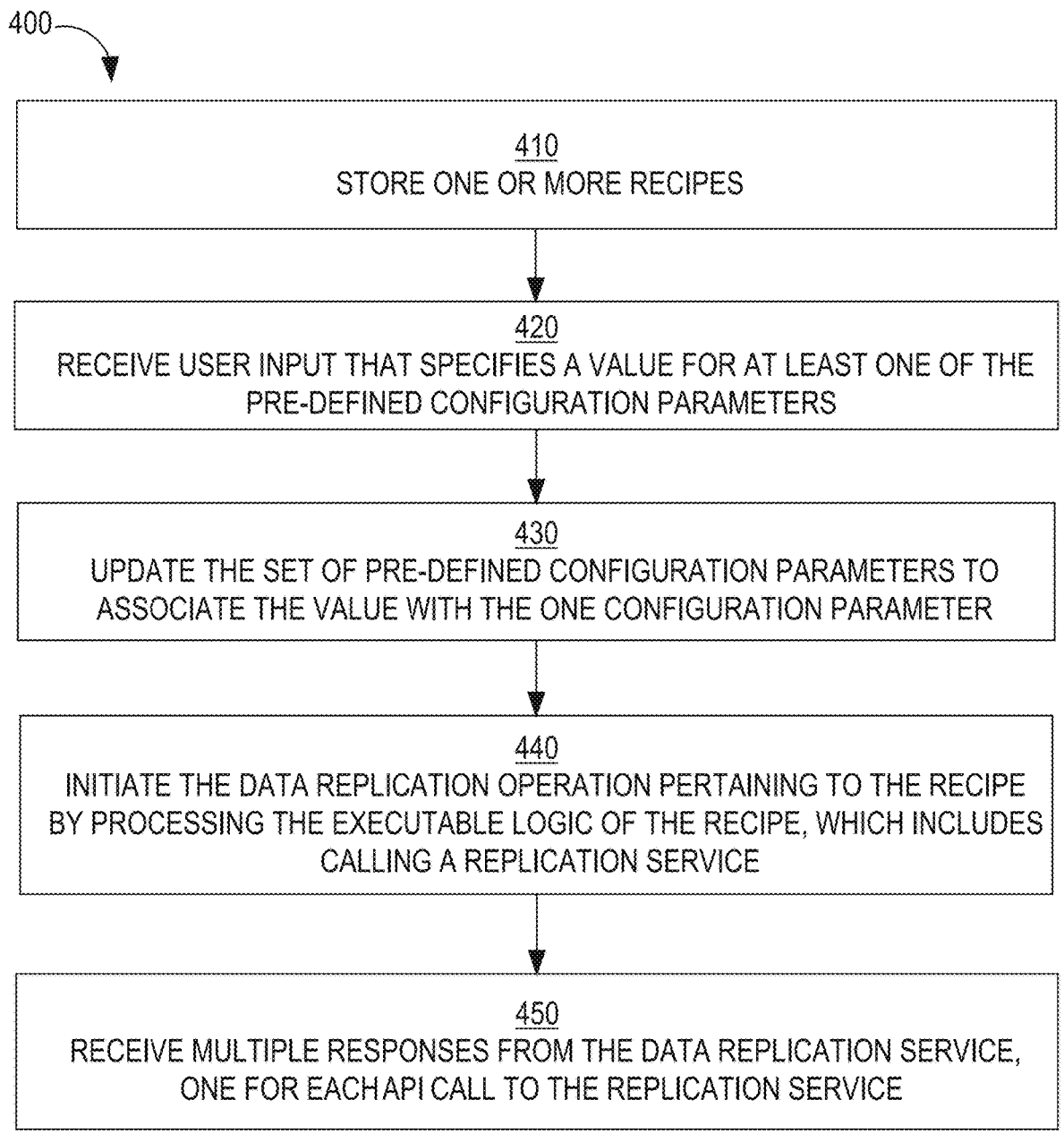
FIG. 4 is a flow diagram that depicts an example process 400 for processing a recipe and a resulting pipeline, in an embodiment.

FIG. 4 is a flow diagram that depicts an example process 400 for processing a recipe and a resulting pipeline, in an embodiment. Process 400 may be implemented by one or more components of orchestration service 130.

At block 410, one or more recipes are stored in persistent storage, such as recipe storage 134. A user with expert knowledge of replication service 140 may define the one or more recipes. Each recipe comprises (1) metadata pertaining to a set of configuration parameters and (2) executable logic that comprises a plurality of sub-steps. Each configuration parameter corresponds to one of the plurality of sub-steps. Each recipe corresponds to a data replication operation, such as unidirectional replication, bidirectional replication, replication with multiple destinations, heterogenous replication, change event streaming, backup, restore, export, or import.

The set of configuration parameters may include a first configuration parameter that is associated with a default value and a second configuration parameter that is not associated with any default value. Alternatively, all configuration parameters in the set are associated with default values.

Block 410 may be preceded by a UI generation phase where a user interface is generated based on the set of pre-defined configuration parameters. Some of the configuration parameters include widget data, or data that describes a type of user interface element to use to present the corresponding configuration parameter. The user interface allows a user to specify one or more values for one or more of the pre-defined configuration parameters.

At block 420, user input is received that specifies a value for at least one of the pre-defined configuration parameters. Block 420 may also involve receiving user input pertaining to multiple configuration parameters and establishing data connections with one or more data sources from which to read data and/or to which to write data.

At block 430, the set of pre-defined configuration parameters is updated to associate the value with the second configuration parameter. If block 420 involves receiving multiple values pertaining to multiple configuration parameters, then block 430 involves updating those configuration parameters in the recipe.

At block 440, the data replication operation pertaining to the recipe is initiated by processing the executable logic of the recipe. Processing the executable logic comprises, for each sub-step of multiple sub-steps in the plurality of sub-steps, making an application programming interface (API) call to a data replication service, such as replication service 140. The API call may transit over a LAN, WAN, or the Internet. The data replication service supports and implements the API and, therefore, recognizes the API call and performs one or more operations in response to the API call.

At block 450, multiple responses are received from the data replication service, one response for each API call to the data replication service. Block 450 may involve updating a user interface based on one or more of the responses to show progress of processing the recipe.

Advantages

Embodiments related to orchestration service 130 provide numerous advantages. Orchestration service 130 performs the difficult and complicated work in the background, communicating with replication service 130. Orchestration service 130 (or the framework generally) provides a user interface for selecting a recipe, populating configuration parameters of the recipe, and executing the recipe. Orchestration service 130 REST API-based, which makes batch jobs easier. Orchestration service 130 is easily extendible to allow for additional use cases through recipes.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
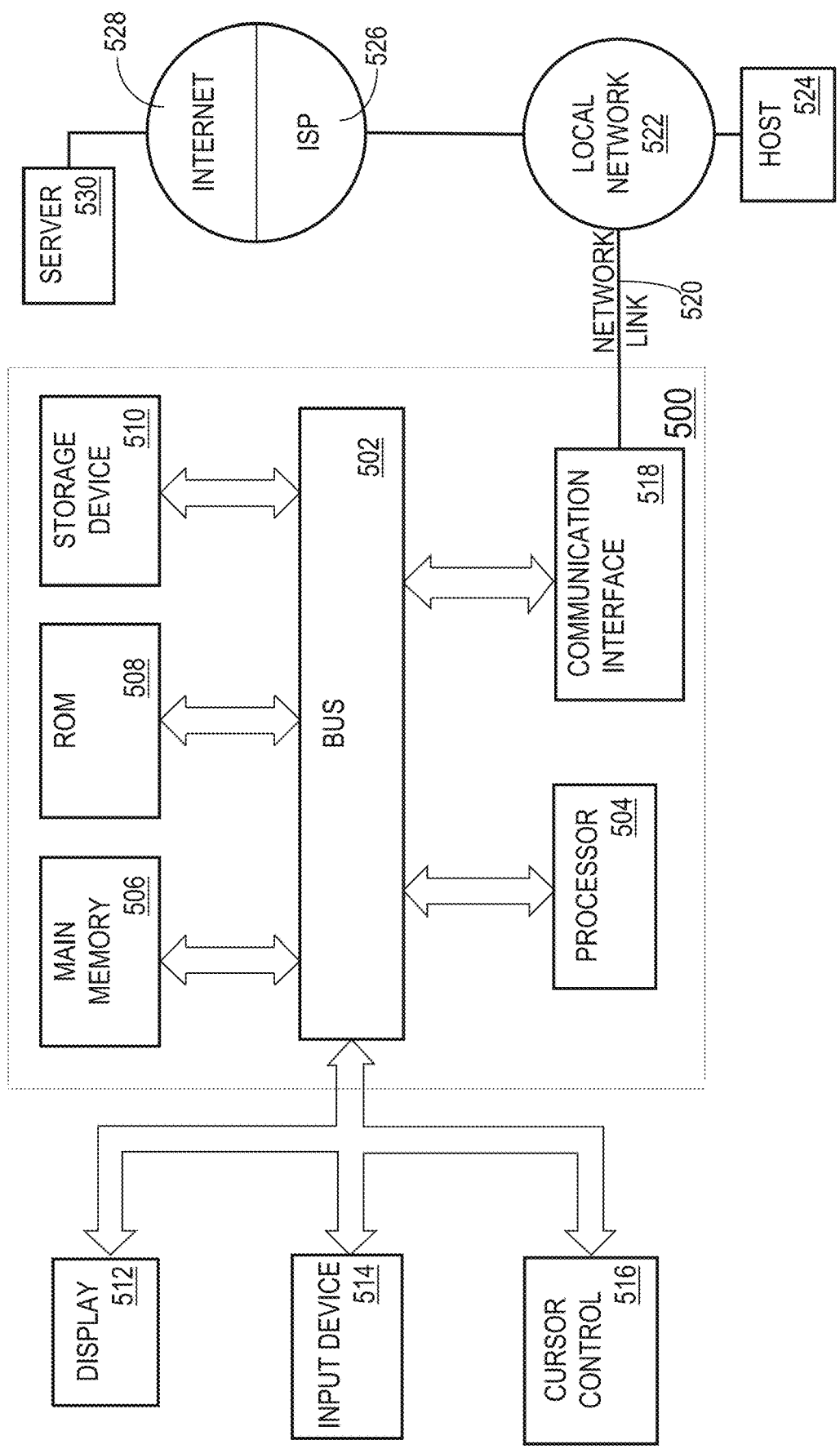
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing a recipe that comprises (1) a set of configuration parameters and (2) executable logic, for a data replication operation, that comprises a plurality of sub-steps,
      wherein each sub-step in the plurality of sub-steps corresponds to one or more configuration parameters in the set of configuration parameters, wherein the set of configuration parameters include a first configuration parameter that is associated with a default value and a second configuration parameter that is not associated with any default value;

receiving user input that specifies a value for the second configuration parameter;

updating the set of configuration parameters to associate the value with the second configuration parameter;

after updating the set of configuration parameters, initiating the data replication operation by processing the executable logic;

wherein processing the executable logic comprises, for each sub-step of one or more sub-steps in the plurality of sub-steps, making an application programming interface (API) call to a data replication service;

receiving, from the data replication service, a plurality of responses, one response for each call to the data replication service;

wherein the method is performed by one or more computing devices.

2. The method of claim 1, further comprising:
prior to receiving the user input, reading the set of configuration parameters and determining, based on the set of configuration parameters, a set of user interface elements to include in a user interface;
wherein a particular user interface element in the set of user interface elements corresponds to the second configuration parameter;
causing the user interface to be presented on a screen of a computing device of a user;
wherein receiving the user input comprises receiving the user input through the particular user interface element.

3. The method of claim 2, wherein the user interface is a second user interface,
the method further comprising:
determining a plurality of recipes that includes the recipe and one or more other recipes;
prior to receiving the user input:
causing a first user interface to be presented on the screen, wherein the first user interface lists the plurality of recipes;
receiving first input that selects the recipe;
wherein causing the second user interface to be presented is performed in response to receiving the first input.

4. The method of claim 1, wherein processing the executable logic comprises, for each sub-step of one or more second sub-steps in the plurality of sub-steps, making a call to a data source from which data is to be read in order to execute the data replication operation.

5. The method of claim 4, wherein the data source is a database or an event stream.

6. The method of claim 1, further comprising:
receiving second input that specifies first connection data and second connection data;
in response to receiving the second input:
establishing a first connection with a first data source based on the first connection data;
establishing a second connection with a second data source, that is different than the first data source, based on the second connection data;
wherein processing the executable logic comprises, for a first sub-step of the plurality of sub-steps, generating a first call and sending the first call to the first data source using the first connection;
wherein processing the executable logic comprises, for a second sub-step of the plurality of sub-steps, generating a second call and sending the second call to the second data source using the second connection.

7. The method of claim 1, further comprising:
while processing the executable logic, receiving, from the data replication service, a plurality of artifact data, each artifact data corresponding to a different sub-step of the plurality of sub-steps and indicating an artifact generated by the data replication service.

8. The method of claim 1, further comprising:
storing state data that was generated while processing a particular sub-step of the plurality of sub-steps;
in response to determining that the particular sub-step failed, deleting the state data from a result of executing the data replication operation and re-processing the particular sub-step.

9. The method of claim 1, wherein the recipe indicates an order in which to process the plurality of sub-steps, wherein the plurality of sub-steps comprises a first sub-step and a second sub-step that is to be processed after processing the first sub-step, the method further comprising:
storing state data associated with processing the executable logic;
in response to determining that the second sub-step failed, deleting the state data and re-initiating the data replication operation by processing the first sub-step again.

10. The method of claim 1, further comprising:
while processing the executable logic, receiving, from the data replication service, a plurality of event updates;
for each event update in the plurality of event updates:
identifying a sub-step of the plurality of sub-steps that corresponds to said each event update,
storing association data that associates the sub-step with event data that is based on the event update,
updating a user interface to indicate an association of the sub-step with the event data.

11. The method of claim 10, wherein the event update is one of an updated status, an artifact, a message, an updated progress, a begin time, an end time, or an updated estimated completion time.

12. The method of claim 1, wherein the data replication operation is one of unidirectional replication, bidirectional replication, replication with multiple destinations, heterogenous replication, change event streaming, backup, restore, export, or import.

13. The method of claim 1, further comprising:
storing a plurality of templates, each for a different sub-step of multiple sub-steps;
after updating the set of configuration parameters, for each configuration parameter of one or more configuration parameters of the set of configuration parameters:
identifying a template, of the plurality of templates, that corresponds to said each configuration parameter;
based on the template and said each configuration parameter, generating a payload for a particular call to the data replication service.

14. One or more non-transitory storage media storing instructions which, when executed by one or more computing devices, cause:
storing a recipe that comprises (1) a set of configuration parameters and (2) executable logic, for a data replication operation, that comprises a plurality of sub-steps, wherein each sub-step in the plurality of sub-steps corresponds to one or more configuration parameters in the set of configuration parameters, wherein the set of configuration parameters include a first configuration parameter that is associated with a default value and a second configuration parameter that is not associated with any default value;

receiving user input that specifies a value for the second configuration parameter;

updating the set of configuration parameters to associate the value with the second configuration parameter;

after updating the set of configuration parameters, initiating the data replication operation by processing the executable logic;

wherein processing the executable logic comprises, for each sub-step of one or more sub-steps in the plurality of sub-steps, making an application programming interface (API) call to a data replication service;

receiving, from the data replication service, a plurality of responses, one response for each call to the data replication service.

15. The one or more storage media of claim 14, wherein the instructions, when executed by the one or more computing devices, further cause:

prior to receiving the user input, reading the set of configuration parameters and determining, based on the set of configuration parameters, a set of user interface elements to include in a user interface;

wherein a particular user interface element in the set of user interface elements corresponds to the second configuration parameter;

causing the user interface to be presented on a screen of a computing device of a user;

wherein receiving the user input comprises receiving the input through the particular user interface element.

16. The one or more storage media of claim 14, wherein processing the executable logic comprises, for each sub-step of one or more second sub-steps in the plurality of sub-steps, making a call to a data source from which data is to be read in order to execute the data replication operation.

17. The one or more storage media of claim 14, wherein the instructions, when executed by the one or more computing devices, further cause:

receiving second input that specifies first connection data and second connection data;

in response to receiving the second input:

establishing a first connection with a first data source based on the first connection data;

establishing a second connection with a second data source, that is different than the first data source, based on the second connection data;

wherein processing the executable logic comprises, for a first sub-step of the plurality of sub-steps, generating a first call and sending the first call to the first data source using the first connection;

wherein processing the executable logic comprises, for a second sub-step of the plurality of sub-steps, generating a second call and sending the second call to the second data source using the second connection.

18. The one or more storage media of claim 14, wherein the instructions, when executed by the one or more computing devices, further cause:

while processing the executable logic, receiving, from the data replication service, a plurality of artifact data, each artifact data corresponding to a different sub-step of the plurality of sub-steps and indicating an artifact generated by the data replication service.

19. The one or more storage media of claim 14, wherein the instructions, when executed by the one or more computing devices, further cause:

storing state data that was generated while processing a particular sub-step of the plurality of sub-steps;

in response to determining that the particular sub-step failed, deleting the state data from a result of executing the data replication operation and re-processing the particular sub-step.

20. The one or more storage media of claim 14, wherein the recipe indicates an order in which to process the plurality of sub-steps, wherein the plurality of sub-steps comprises a first sub-step and a second sub-step that is to be processed after processing the first sub-step, wherein the instructions, when executed by the one or more computing devices, further cause:

storing state data associated with processing the executable logic;

in response to determining that the second sub-step failed, deleting the state data and re-initiating the data replication operation by processing the first sub-step again.

* * * * *